INVENTOR.
Robert M. Bishop.

By William J. Herman
Attorney

Sept. 24, 1968 R. M. BISHOP 3,403,222

FACSIMILE RECEIVER PHASING MEANS UTILIZING PARTICULAR POWER SUPPLY MEANS TO EFFECT SYNCHRONIZATION

Filed May 24, 1965 2 Sheets-Sheet 2

INVENTOR

Robert M. Bishop

By William J. Newman

Attorney

United States Patent Office 3,403,222

Patented Sept. 24, 1968

3,403,222

FACSIMILE RECEIVER PHASING MEANS UTILIZING PARTICULAR POWER SUPPLY MEANS TO EFFECT SYNCHRONIZATION

Robert M. Bishop, Arlington Heights, Ill., assignor to Stewart-Warner Corporation, Chicago, Ill., a corporation of Virginia Filed May 24, 1965, Ser. No. 458,092
9 Claims. (Cl. 178—69.5)

ABSTRACT OF THE DISCLOSURE

A power supply for facsimile systems or the like in which a synchronizing signal received from a remote meter is used as a low level trigger for an alternating current generating circuit having silicon controlled rectifiers.

Figure 1:
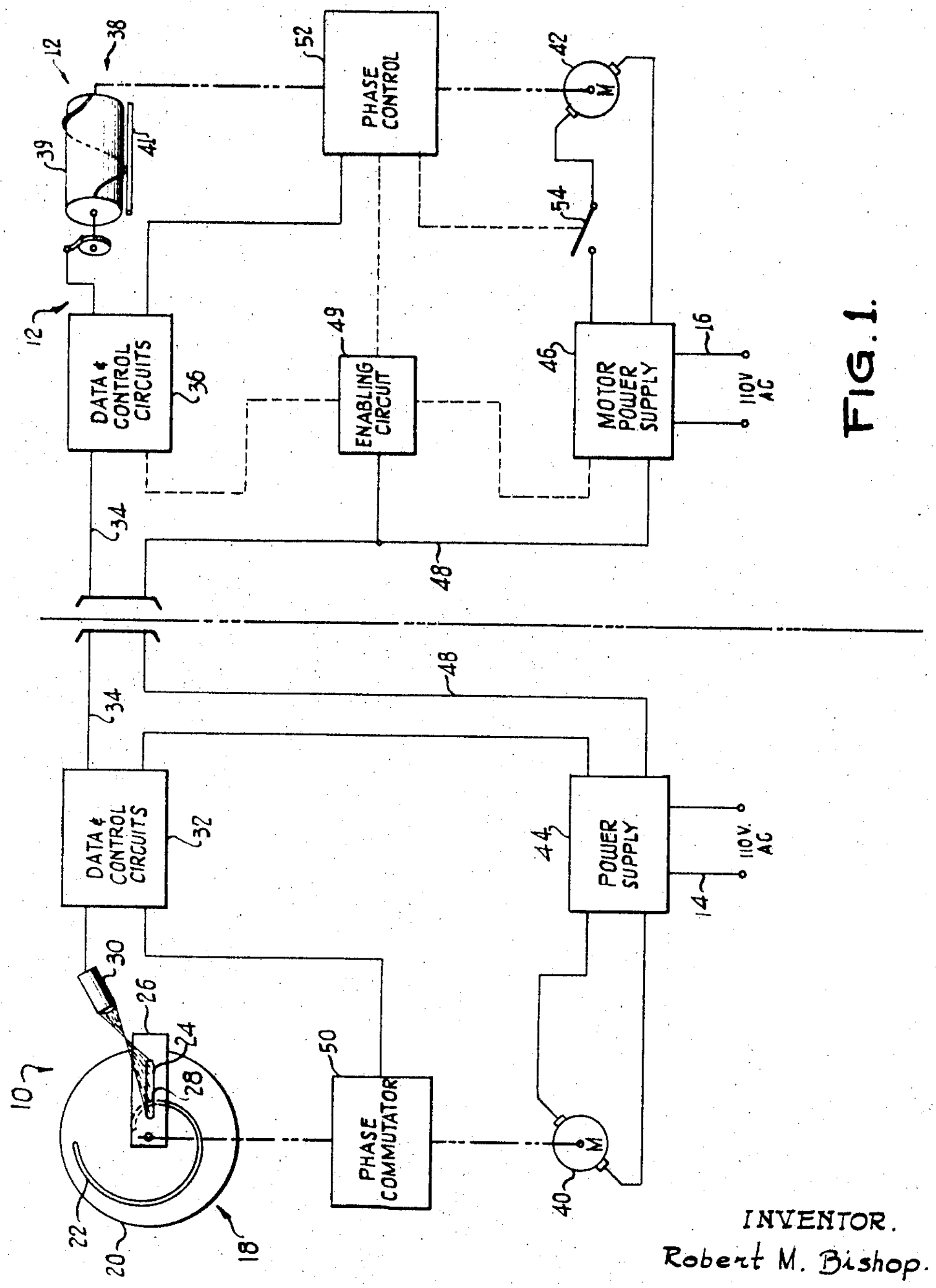

This invention pertains to power supplies for use in facsimile systems, or the like, and more particularly to power supplies which may be used for driving motors in facsimile receivers in synchronism with motors located in the facsimile transmitters.

Facsimile systems are used primarily for relaying duplicate copy representations of documents between remote locations. Generally, a facsimile system comprises a transmitter in which an electro-mechanical means scans the document to produce a signal which varies in accordance with the light intensity of the segment of the document being scanned. A receiver at the remote location applies the varying signals to an electro-mechanical scanning transducer to cause the marking of an electro-sensitive medium with the light density of the mark corresponding to the document being scanned at the transmitter.

The scanning means in the transmitter and the receiver must be synchronized with one another so that the copy formed at the receiver is essentially a reproduction of the document scanned at the transmitter. The two scanning means must scan at exactly the same frequency and in the proper phase relationship so that each line marked at the receiver is a duplicate of the document line scanned at the transmitter.

This is no great problem when the facsimile transmitter and the facismile receiver are operating off of the same commercial power network as two synchronous motors may be designed to operate in synchronism in accordance with the characteristics of the power network. A problem arises, however, when the facsimile receiver is located a great distance from the facsimile transmitter so that they are served by different power networks. Even though power networks throughout the country are governed by national standards there may be slight deviations in frequency and/or phase of the currents between area networks which cause distortions in facsimile transmission. Synchronization is accomplished under these conditions by the transmission of a reference signal corresponding to the power network signal at the transmitter location along with the facsimile data transmission. In previous facsimile power supplies the reference signal was power amplifier directly to energize the motor for driving the electro-mechanical marking transducer. This required the use of bulky, inefficient and expensive components necessitating a power supply housing almost as big as the facsimile receiver itself. High current power amplifiers, large power transformers and other components were required to provide the necessary power for driving the receiver motor which resulted in expensive and cumbersome units.

The present invention is directed to a power supply which is less expensive and, more important, smaller in size such that it may be located within the housing for the facsimile receiver itself. The synchronizing signal received from the transmitter is used as a low level trigger for an alternating current generating circuit having silicon controlled rectifiers. The power supply is designed such that no power transformers or other large expensive components are required in producing power for driving the facsimile receiver motor. A highly efficient synchronizing power supply is thereby provided which is small enough in size to fit into the cabinet housing the facsimile receiver and which is relatively inexpensive compared to the cost of previous synchronizing power supplies. A facsimile system for which the present invention is readily adaptable is disclosed in the copending application of Dudley Gray, U.S. Patent Office application Ser. No. 307,844, filed Sept. 10, 1963.

It is therefore an object of this invention to provide unique synchronizing power supply for use in a facsimile receiver, or the like.

It is also an object of this invention to provide a synchronizing power supply which produces an output which is accurately synchronized with a reference signal received.

Another object of this invention is to provide a synchronizing power supply for a facsimile receiver or the like which is efficient, small in size and relatively economical.

Figure 2:
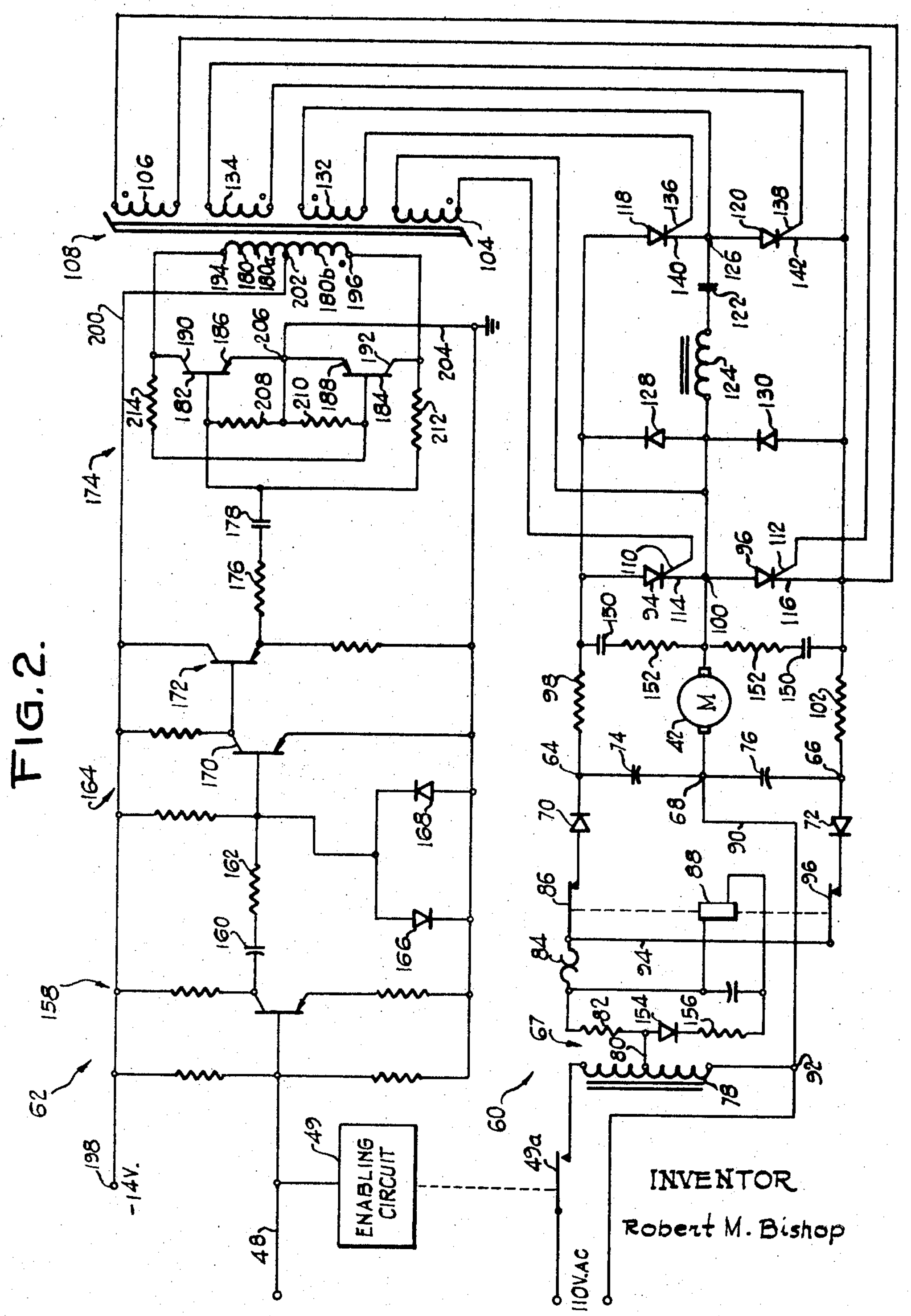

Other objects and advantages of this invention will become more apparent upon a further reading of this specification especially when taken in view of the accompanying drawings in which:

FIGURE 1 is a block diagram of a facsimile system including a transmitter receiver, and the transmission network between the remotely located units; and FIGURE 2 is a schematic diagram of a synchronizing facsimile receiver power supply for use in a system such as shown in FIGURE 1.

Referring first to FIGURE 1 there is shown a facsimile system including a transmitter 10 and a receiver 12 which are located from each other such that the commercial power source serving the transmitter at terminals 14 is different than the power source serving the receiver at power terminals 16. The transmitter has an electro-mechanical scanning transducer 18 which may be of the type which includes a rotating opaque disc 20 having a spiral slit 22. The spiral slit 22 cooperates with a linear slit 24 in opaque member 26 to provide a linear scanning opening 28 at the intersection of the two slits through which a photosensitive device 30 may view a small segment of the document (not shown) to be copied. The photosensitive element 30 provides to the data and control circuits 32 a signal fluctuating in accordance with the light intensity of the document segment wherein it is prepared for transmission through conductor 34 to the facsimile receiver 12.

The data and control circuits 36 in the receiver prepare the received signal for marking the recording paper by the marking transducer 38 which may be a rotating helix drum 39 and linear bar electrode 41. The marking transducer 38 produces marks having a density in accordance with the light intensity of the scanned document portion in a manner well known in the facsimile art.

The document scanning transducer 18 of the transmitter and the copy marking transducer 38 at the receiver are driven by respective motors 40, 42, respectively, which must operate in synchronism if there is to be a minimum of distortion between the document scanned and the copy reproduced. To accomplish this motors 40, 42 must be energized by synchronized electric power signals from their respective power supplies 44, 46 regardless of any frequency and phase differentials between the network power appearing at their respective terminals 14 and 16. This is accomplished by supplying a separate reference signal from the transmitter power supply 44 through conductor 48 to the receiver motor power supply 46. The reference signal, after causing the enabling circuit 49 to prepare each of the various receiver circuits at the beginning of transmission, controls the power supply output to energize the receiver marking transducer motor 42 in the manner to be hereinafter described.

Since multi-pole, synchronous motors are generally used in facsimile systems means are also provided for synchronizing the rotor positions of the transducer motors 40 and 42. The transmitter motor 40 drives phase commutators 50 which produce a pulse for every revolution of the opaque disc 20 during a phasing portion of facsimile transmission. These pulses are used to actuate a phase control device 52 in the receiver. The phase control device 52 causes momentary interruptions in the power to the transducer motor 42 at contacts 54 and the rotor of the motor 42 slips back one pole for each interruption until proper alignment is accomplished in a well known manner.

The motor power supply is shown in schematic detail in FIGURE 2 which will now be described. It comprises a power circuit 60 for energizing the facsimile receiver motor 42 and a control circuit 62 for synchronizing the alternating current delivered to the motor 42 with the synchronizing signal on line 48 from the transmitter.

In the power circuit 60, equal and opposite DC voltages (+E and −E) are provided at high voltage contacts 64, 66 with respect to the common terminal 68. In the particular circuit shown the equal and opposite DC voltages are provided by two simple, half-wave rectifiers including diodes 70, 72, capacitors 74, 76, and an autotransformer 67. Positive DC voltage appears between terminals 64 and 68 by the circuit from tap 80 on the autotransformer 67 through resistor 82, normally closed time delay switch contacts 84, contacts 86 of a power relay 88, diode 70, terminal 64, capacitor 74, common terminal 68 and conductor 90 to the common terminal 92 of the autotransformer 68. Negative DC voltage appears between contacts 66 and 68 by the circuit from autotransformer tap 80 through resistor 82, time delay contacts 84, conductor 94, contacts 96 of the power relay 88, diode 72, terminal 66, capacitor 76, terminal 68 and conductor 90 to the autotransformer common terminal 92.

AC power for the motor 42 is derived from the DC power at terminals 64, 66, 68 by means of silicon controlled rectifiers 94, 96 which are triggered on and off responsive to the control circuit 62 which is in receipt of the synchronizing signal from the facsimile transmitter. The circuits are so adapted that the silicon controlled rectifiers 94, 96 are alternately triggered into conduction to provide an alternating current to the motor 42. For example, when silicon controlled rectifier 94 is conducting positive current flows from terminal 64 through current limiting resistor 98, the anode to cathode circuit of silicon controlled rectifier 94, terminal 100, and the AC synchronous motor 42 to terminal 68. When silicon controlled rectifier 96 is conducting positive current flows from common terminal 68 through the receiver motor 42, terminal 100, the anode to cathode circuit of silicon controlled rectifier 96, current limiting resistor 102, to the negative DC terminal 66.

The silicon controlled rectifiers 94 and 96 are triggered into conduction by signals from respective opposite-polarity, secondary windings 104 and 106 of a saturable core type output transformer 108 of control circuit 62. The windings 104, 106 are connected between the respective gates 110, 112 and the respective cathodes 114, 116 to trigger their conduction in accordance with the synchronized signal in a manner to be hereinafter described.

Cutoff of the silicon controlled rectifiers 94, 96 is provided through the action of silicon controlled rectifiers 118, 120 in conjunction with capacitor 122 and inductance 124. The silicon controlled rectifiers 118, 120 are in forward series connection across the series connection of the other two silicon controlled rectifiers 94, 96 and the capacitor 122 is series connected with inductance 124 between the junction 100 between the two silicon controlled rectifiers 94 and 96 and junction 126 between the silicon controlled rectifiers 118, 120. A diode 128 is reverse connected across the anode to cathode circuit of silicon controlled rectifier 94 while diode 130 is reverse connected across the anode to cathode circuit of silicon controlled rectifier 96.

The silicon controlled rectifiers 118 and 120 are triggered into conduction by means of opposite-polarity transformer secondary windings 132, 134, respectively, connected between the gates 136, 138 and the cathodes 140, 142 of silicon controlled rectifiers 118, 120. Thus, it may be seen that silicon controlled rectifiers 94 and 120 are triggered for conduction during one phase portion of the output of the control circuit 62 and silicon controlled rectifiers 96 and 118 are triggered for conduction during the opposite portion thereof.

The power circuit 60 operates in the following manner to provide alternating current through motor 42 responsive to the silicon controlled rectifier trigger signals appearing at the control circuit output transformer windings 104, 106, 132, 134. Assume, that silicon controlled rectifiers 94 and 120 have just been triggered into their conducting states by their respective trigger windings 104, 134. Capacitor 122 charges towards the total voltage (2E) between terminals 64, 66 through the circuit from terminal 64 through resistor 98, silicon controlled rectifier 94, junction 100, inductor 124, capacitor 122, junction 126, silicon controlled rectifier 120, and resistor 102 to terminal 66. Silicon controlled rectifier 120 will cease to conduct as the voltage across 122 approaches full charge due to the reduction in current below its minimum holding level. Silicon controlled rectifier 94 will continue to conduct, however, and supply current to the motor 42.

When the phase of the signals at the secondary windings of transformer 108 reverse such that positive signals appear at the gates 112, 136 of silicon controlled rectifiers 96 and 118, respectively, they begin to conduct causing capacitor C12 to begin discharging through the circuit including inductor 124, diode 128, silicon controlled rectifier 118 and junction 126. The small drop across the diode 128 reverse biases the anode to cathode circuit of silicon controlled rectifier 94 to cut it off. Silicon controlled rectifier 96 is now in conduction causing current to flow through the motor 42 in the opposite direction. Capacitor 122 charges in the opposite direction through the circuit including silicon controlled rectifier 118, junction 126, capacitor 122, inductance 124, junction 100 and silicon controlled rectifier 96 so that the process is repeated again in the opposite direction when silicon controlled rectifiers 94 and 120 are triggered into conduction.

It is to be noted that for a brief period of time during each half-cycle, silicon controlled rectifiers 94 and 96 are both in conduction across the high voltage terminals 64, 66. However, current limiting resistors 98 and 102 prevent this current from becoming excessive. If these resistors were not provided more sophisticated trigger circuits would be required which would delay turning on the one silicon controlled rectifier until after the other had been completely turned off.

The capacitors 150 and resistors 152 in series connection across each of the silicon controlled rectifiers 94, 96 are provided to prevent the spurious conduction of all of the silicon controlled rectifiers which might result from the sudden application of high voltage thereacross such as when the circuit is first turned on. Additional precautions have been taken in the design of the circuit to prevent damage to the circuit which might result from excessive currents if either pair 94, 96 or 118, 120 of silicon controlled rectifiers is spuriously triggered into conduction. For example, the relay 88 is series connected with diode 154 and resistor 156 across the resistor 82 in the secondary circuit of the autotransformer 67. If the voltage drop across resistor 82 becomes too great due to excessive current the normally closed relay contacts 86 open to remove power from terminals 64, 66. The time delay switch contacts 84 provide additional protection against excessive currents therethrough. Switch 84 may be of the thermal actuated type which will open if the excessive current lasts more than a predetermined time.

As previously mentioned, the control circuit 62 provides the trigger pulses for the silicon controlled rectifiers responsive to the synchronizing signal received from the facsimile transmitter. The synchronizing signal is amplified by the temperature compensated, Class A, common-emitter amplifier 158 and coupled through capacitor 160 and resistor 162 to a pulse shaper circuit 164 which transforms it into a square wave. The small voltage drop across diodes 166, 168 when they are conducting in the forward direction provide a low level square wave signal which is amplified by transistor 170. The direct coupled emitter-follower amplifier 172 provides a low impedance source for triggering an astable multivibrator 174 through coupling resistor 176 and capacitor 178.

The multivibrator 174 is uniquely designed to provide four separate square wave output signals with no common connections so that the silicon controlled rectifiers 94, 96, 118, 120 may be triggered in the simplest manner. The multivibrator 174 comprises the center tapped primary 180 of saturable core transformer 108 and two transistors 182, 184 having their respective emitters 186, 188 connected to ground with their respective collectors 190, 192 connected to opposite ends 194, 196 of the saturable core transformer primary 180. Static collector current for the transistors is provided from the DC power souce 198 through conductor 200, primary center tap 202 and the respective ends 194, 196 of the transformer primary 190, 192. The transistors are statically biased for forward conduction through the circuits leading from ground through conductor 204, junction 206, respective biasing resistors 208, 210, and respective feed-back resistors 212, 214 to the transistor collectors 190, 192 whereat the DC supply voltage appears through the circuit hereinbefore described.

The multivibrator 174 runs free in the following manner. Assume transistor 182 draws more current initially than transistor 184. The current flowing through the emitter to collector circuit of transistor 182 causes a larger voltage drop across the upper portion **180*a* of the saturable transformer primary than that caused in the opposite direction through the lower portion 180*b* by the current flow through transistor 184. Thus, the end 194 of transformer primary 180 becomes more positive than the end 196 which is reflected back to the bases of the transistors 182, 184 through the respective resistors 214, 212. Transistor 182 is caused by regenerative action to conduct even heavier while the conduction of transistor 184 is reduced. Transistor 184 is quickly cut off by this process and maintained cut off by the induced voltage in the lower portion 180*b* by the rise in current flow in the upper portion. As the transformer core approaches saturation the current through the primary reduces and the cut off bias to transistor 184 lessens. The collapsing flux field generates an opposite-polarity voltage at the lower end 196 of the primary so as to reverse the forward bias of transistor 182 to further cut the current flow through the upper portion 180*a* of the primary. Thus, there is a regenerative action to cause transistor 182 to cut off and transistor 184 to conduct heavily. Current flow through the transistor 184 and the lower portion 180*b* of the primary builds up to saturate the transformer core in the opposite direction at which time the cycle is again reversed. The switching time between opposite core saturation conditions is very fast so that the output signals at the transformer secondaries 104, 106, 132 and 134** are essentially square wave in shape.

The multivibrator 174 is designed to oscillate at a frequency slightly less than the synchronizing signal appearing at the input of the control circuit 62. It will continue to oscillate at this frequency during the period when the facsimile receiver is in a power on condition but no signal is being received from the facsimile transmitter. As soon as a signal is received from the transmitter the multivibrator 174 is synchronized therewith by means of the square wave signal provided by the output of the emitter follower 172 through the coupling resistor 176 and capacitor 178 to the base of multivibrator transistor 182. The output signals at the transformer secondaries control the conduction of silicon controlled rectifiers 94 and 96 in the power circuit so that the current through facsimile receiver motor 42 is alternating in synchronism with the synchronizing signal received from the facsimile transmitter.

The free running multivibrator 174 in the control circuit 52 performs an additional beneficial function at the end of the facsimile transmission. The power circuit 60 is connected to the commercial power source only during the receipt of signals from the transmitter by means of contacts **49*a* actuated by the enabling circuit 49. The enabling contacts 49*a* are closed upon receipt of the synchronizing signal from the transmitter at the beginning of transmission and are opened at the end of transmission when the synchronizing signal is discontinued. If it weren't for the free running multivibrator, the last fired silicon controlled rectifier 94 or 96 would continue conducting after the opening of contacts 49*a* to discharge the DC supply capacitor 74 or 76 associated therewith leaving the system in an unbalanced condition which could cause false triggering and failure of the inverter during subsequent messages. The free running multivibrator 174 serves to alternately trigger the silicon controlled rectifiers 94, 96 into conduction to discharge the capacitors 74, 76 at a uniform rate. When the capacitors are discharged the silicon controlled rectifiers no longer are fired responsive to the trigger signals at their gates. The unbalance conditions are thus obviated by use of the free running multivibrator in the control circuit 62.**

While there has been described herein a preferred embodiment of this invention, it is recognized that many modifications and additions may be made thereto without departing from the teachings of the invention. It is therefore intended to be bound only by the scope of the appended claims.

What is claimed is:

1. In a facsimile system having a transmitter with a synchronous alternating-current motor driven copy document scanner and an alternating current source; a receiver with a synchronous alternating current motor-driven document marker; and means for supplying a reference signal to the receiver from said transmitter alternating current source; a power supply for driving said receiver motor in synchronism with said transmitter motor comprising a control circuit and a power circuit; said control circuit comprising an astable multivibrator having a saturable transformer with a center-tapped primary winding and two pairs of opposite polarity secondary windings, said multivibrator also having a pair of similar transistors having their respective emitter connected to ground and their respective collectors connected to opposite ends of said transformer primary, a resistance connected between the base of each of said transistors and ground, and means connecting the base of each transistor with the end of said primary connected to its respective transistor collector said multivibrator tuned to oscillate at a frequency slightly below the frequency of said reference signal; means in receipt of said reference signal for shaping said signal into a square wave form and applying same to the base of at least one of said transistors; said power circuit comprising a direct current source having a pair of substantially equal and opposite voltage terminals and a common terminal, a first silicon-controlled rectifier having its cathode connected to one terminal of said receiver motor, a first resistor connected between the anode of said silicon-controlled rectifier and the positive one of said direct current voltage terminals, a second silicon-controlled rectifier having its anode connected to said one terminal of said receiver motor, a second resistor connected between the cathode of said second silicon-controlled rectifier and the negative voltage terminal, means connecting the other terminal of said receiver motor to the common terminal of said direct current source, a first diode reverse connected across said first silicon-controlled rectifier, a second diode reverse connected across said second silicon-controlled rectifier, a third silicon-controlled rectifier having its anode connected to the anode of said first silicon-controlled rectifier, a fourth silicon-controlled rectifier having its anode connected to the cathode of said third silicon-controlled rectifier and its cathode connected to the cathode of said second silicon-controlled rectifier, a capacitance and an inductance series connected between the interconnection of said third and fourth silicon-controlled rectifiers and said one terminal of said receiver motor, means connecting the gates of each of said first and fourth silicon-controlled rectifiers to a respective secondary winding of one of said pairs of secondary windings of said transformer, and means connecting the gates of each of said second and third silicon-controlled rectifiers to a respective secondary winding of the other of said pairs of secondary winding.

2. In the facsimile system of claim 1 wherein said direct current source comprises means for disabling itself under excessive load current demand and for reenabling itself a predetermined time after being disabled.

3. In a facsimile system having a transmitter with a synchronous alternating current motor-driven copy document scanner and an alternating current source; a receiver with a synchronous alternating current motor-driven document marker; and means for supplying a reference signal to the receiver from said transmitter alternating current source; a power supply for driving said receiver motor in synchronism with said transmitter motor comprising a control circuit and a power circuit; said control circuit comprising an astable multivibrator having a pair of oppositely phased outputs, means in receipt of said reference signal for shaping said signal into a square wave form and synchronizing the oscillation of said multivibrator therewith; said power circuit comprising a direct current source having a pair of substantially equal and opposite voltage terminals and a common terminal, a first silicon-controlled rectifier having its cathode connected to one terminal of said receiver motor, a first resistor connected between the anode of said silicon-controlled rectifier and the positive one of said direct current voltage terminals, a second silicon-controlled rectifier having its anode connected to said one terminal of said receiver motor, a second resistor connected between the cathode of said second silicon-controlled rectifier and the negative voltage terminal, means connecting the other terminal of said receiver motor to the ground connection of said direct current source, a first diode reverse connected across said first silicon-controlled rectifier, a second diode reverse connected across said second silicon-controlled rectifier, a third silicon-controlled rectifier having its anode connected to the anode of said first silicon-controlled rectifier, a fourth silicon-controlled rectifier having its anode connected to the cathode of said third silicon-controlled rectifier and its cathode connected to the cathode of said second silicon-controlled rectifier, a capacitance and an inductance series connected between the interconnection of said third and fourth silicon-controlled rectifiers and said one terminal of said receiver motor, means for applying the signal at one of the multivibrator outputs to the gates of said first and fourth silicon-controlled rectifiers, and means for applying the signal of the other multivibrator output to the gates of said second and third silicon-controlled rectifiers.

4. In a facsimile system having a transmitter with a synchronous alternating current motor-driven copy document scanner and an alternating current source; a receiver with a synchronous alternating current motor-driven document marker; and means for supplying an alternating current reference signal to the receiver from said transmitter alternating current source; a power supply for driving said receiver motor in synchronism with said transmitter motor comprising a direct current source having a pair of substantially equal and opposite voltage terminals and a common terminal, a first silicon-controlled rectifier having its cathode connected to one terminal of said receiver motor, a first resistor connected between the anode of said silicon-controlled rectifier and the positive one of said direct current voltage terminals, a second silicon-controlled rectifier having its anode connected to said one terminal of said receiver motor, a second resistor connected between the cathode of said second silicon-controlled rectifier and the negative voltage terminal, means connecting the other terminal of said receiver motor to the common terminal of said direct current source, a first diode reverse connected across said first silicon-controlled rectifier, a second diode reverse connected across said second silicon-controlled rectifier, a third silicon-controlled rectifier having its anode connected to the anode of said first silicon-controlled rectifier, a fourth silicon-controlled rectifier having its anode connected to the cathode of said third silicon-controlled rectifier and its cathode connected to the cathode of said second silicon-controlled rectifier, a capacitance and an inductance series connected between the interconnection of said third and fourth silicon-controlled rectifiers and said one terminal of said receiver motor, means in receipt of said reference signal for triggering said first and fourth silicon-controlled rectifiers into conduction during one phase portion of said reference signal and for triggering said second and third silicon-controlled rectifiers into conduction during the opposite phase portion of said reference signal.

5. In a facsimile system having a transmitter with a synchronous alternating current motor-driven copy document scanner and an alternating current source; a receiver with a synchronous alternating current motor-driven document marker; and means for supplying an alternating current reference signal to the receivcr from said transmitter alternating current source; a power supply for driving said received motor in synchronism with said transmitter motor comprising a direct current source having a pair of substantially equal and opposite voltage terminals and center tap, a first silicon-controlled rectifier having its cathode connected to one terminal of said receiver motor and its anode connected to one of said direct current voltage terminals, a second silicon-controlled rectifier having its anode connected to said one terminal of said receiver motor and its cathode connected to the other of said direct current voltage terminals, means connecting the other terminal of said receiver motor to the center tap of said direct current source, a first diode reverse connected across said first silicon-controlled rectifier, a second diode reverse connected across said second silicon-controlled rectifier, a third silicon-controlled rectifier having its anode connected to the anode of said first silicon-controlled rectifier, a fourth silicon-controlled rectifier having its anode connected to the cathode of said third silicon-controlled rectifier and its cathode connected to the cathode of said second silicon-controlled rectifier, a capacitance and an inductance series connected between the interconnection of said third and fourth silicon-controlled rectifiers and said one terminal of said receiver motor, means in receipt of said reference signal for triggering said first and fourth silicon-controlled rectifiers into conduction only during one phase portion of said reference signal and for triggering said second and third silicon-controlled rectifiers into conduction only during the opposite phase portion of said reference signal.

6. In the facsimile system of claim 5 wherein said direct current cource comprises means for disabling itself under excessive load current demand and for reenabling itself a predetermined time after being disabled.

7. In a facsimile system having a transmitter with a synchronous alternating current motor-driven copy document scanner and an alternating current source; a receiver with a synchronous alternating current motor-driven document marker; and means for supplying an alternating current reference signal to the receiver from said transmitter alternating current source; a power supply for driving said receiver motor in synchronism with said transmitter motor comprising a direct current power source having a pair of substantially equal and opposite polarity outputs, a first silicon-controlled rectifier in series forward connection with said motor across one polarity output of said power source, a second silicon-controlled rectifier in series forward connection with said motor across the other polarity output of said power source, means in receipt of said reference signal for triggering said first silicon-controlled rectifier into conduction only during one phase portion of said reference signal and for triggering said second silicon-controlled rectifier into conduction only during the opposite phase portion of said reference signal.

8. An inverter circuit for providing alternating current to a load comprising a direct current source having a pair of substantially equal and opposite voltage terminals and a common terminal, a first silicon-controlled rectifier having its cathode connected to one terminal of said load, a first resistor connected between the anode of said silicon-controlled rectifier and the positive one of said direct current voltage terminals, a second silicon-controlled rectifier having its anode connected to said one terminal of said load, a second resistor connected between the cathode of said second silicon-controlled rectifier and the negative direct current voltage terminal, the other terminal of said load connected to the common terminal of said direct current source, a first diode reverse connected across said first silicon-controlled rectifier, a second diode reverse connected across said second silicon-controlled rectifier, a third silicon-controlled rectifier having its anode connected to the anode of said first silicon-controlled rectifier, a fourth silicon-controlled rectifier having its anode connected to the cathode of said third silicon-controlled rectifier and its cathode connected to the cathode of said second silicon-controlled rectifier, a capacitance and an inductance series connected between the interconnection of said third and fourth silicon-controlled rectifiers and said one terminal of said receiver motor, means providing trigger signals of one phase to the gates of said first and fourth silicon-controlled rectifiers, and means providing oppositely phased trigger signals to the gates of said second and third silicon-controlled rectifiers.

9. The inverter circuit of claim 8 wherein said direct current signal source comprises means for disabling itself under excessive load current demand and for reenabling itself a predetermined time after being enabled.

References Cited

UNITED STATES PATENTS 2,685,612 8/1954 Lansil ------------- 178—69.5

OTHER REFERENCES

RCA, Radio Facsimile vol. I, pp. 189–191, October 1938.

ROBERT L. GRIFFIN, *Primary Examiner.*

R. L. RICHARDSON, *Assistant Examiner.*